United States Patent [19]

Gladwin

[11] 4,061,077
[45] Dec. 6, 1977

[54] APPARATUS FOR FORMING LARGE COMPOUND CURVED SURFACES

[76] Inventor: Floyd R. Gladwin, 21000 E. River Road, Grosse Ile, Mich. 48138

[21] Appl. No.: 757,409

[22] Filed: Jan. 6, 1977

[51] Int. Cl.² .............................................. B23C 3/00
[52] U.S. Cl. .................................. 90/15 A; 90/13 R; 90/21 R; 90/58 R; 51/127
[58] Field of Search ................. 90/15 R, 15 A, 13 R, 90/21 R, 58 R, DIG. 2; 51/100 R, 127

[56] References Cited
U.S. PATENT DOCUMENTS

| 3,464,314 | 9/1969 | Gladwin | 90/58 R |
| 3,800,660 | 4/1974 | Gladwin | 90/13 R |
| 3,910,159 | 2/1974 | Gladwin | 90/15 A |

Primary Examiner—Gil Weidenfeld
Attorney, Agent, or Firm—Cullen, Settle, Sloman & Cantor

[57] ABSTRACT

An apparatus for machining a compound curved surface upon a large plate-like metal workpiece comprising an elongated horizontal bed having parallel curved longitudinal edges, a table slidably mounted upon the bed, and having guide strips complementary to and engaging the edges for reciprocating the table horizontally along an arcuate path. A cross-bar is arranged transversely above the bed and table and a support plate having parallel curved edges is mounted upon the bar for slidably moving transversely of the bed. A slide member is mounted upon the support plate and has guide elements engaging the curved edges thereof for movement of the slide member relative to the support plate along an arc whose axis is longitudinal of the bed. A tool member carried by the slide member engages the workpiece, which is fastened to the table, for forming the curved surface thereon as the workpiece is reciprocated longitudinally of the bed, and the tool member is moved transversely of the bed.

10 Claims, 15 Drawing Figures

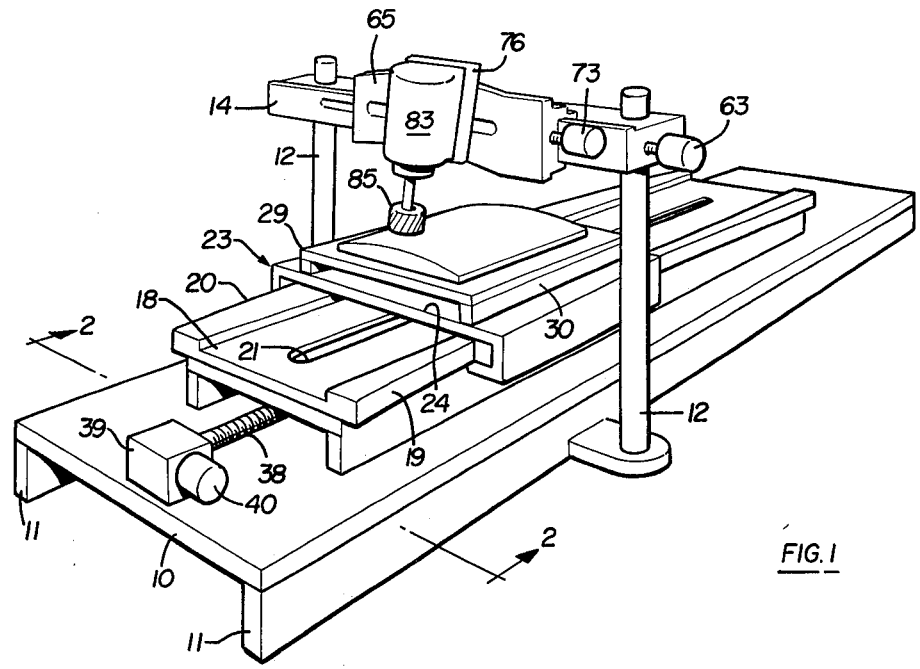
FIG. 1
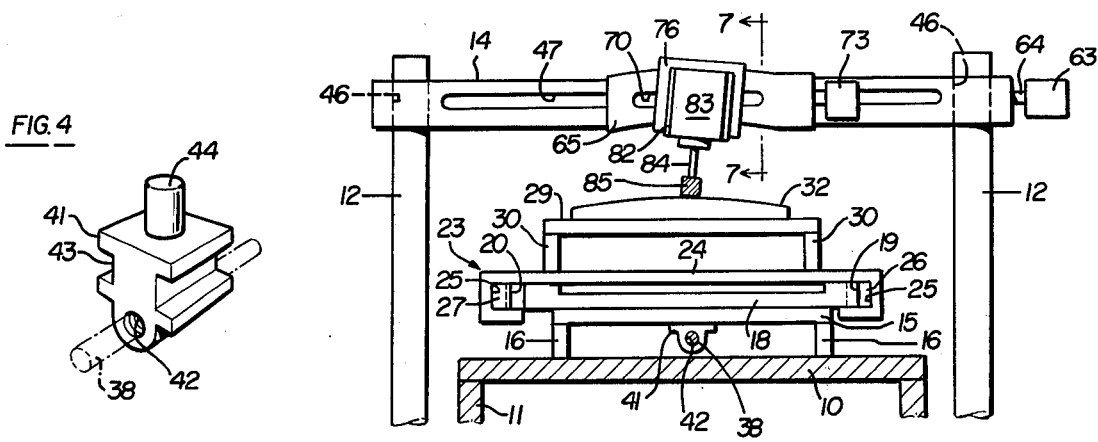
FIG. 4
FIG. 2
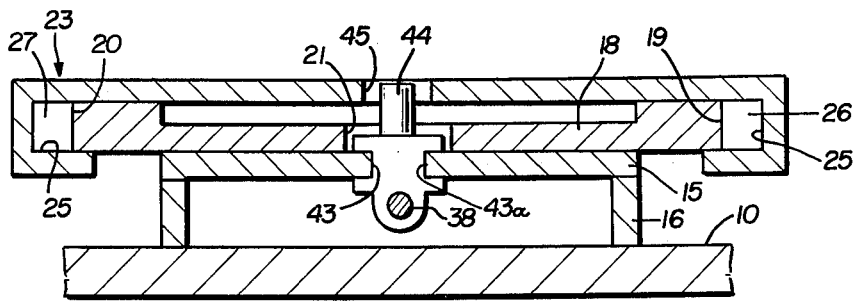
FIG. 3

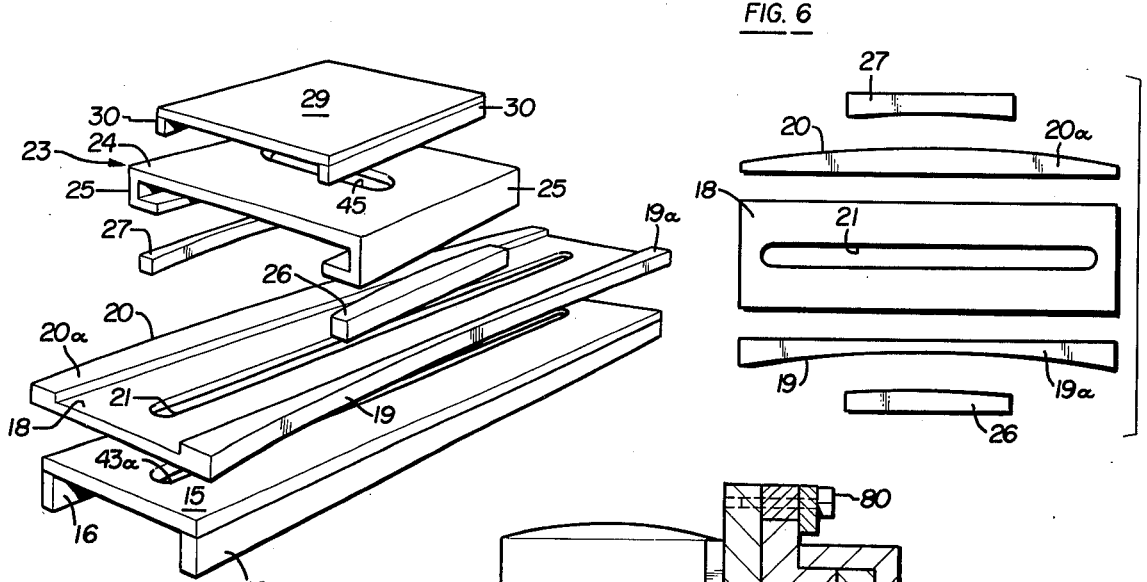
FIG. 5
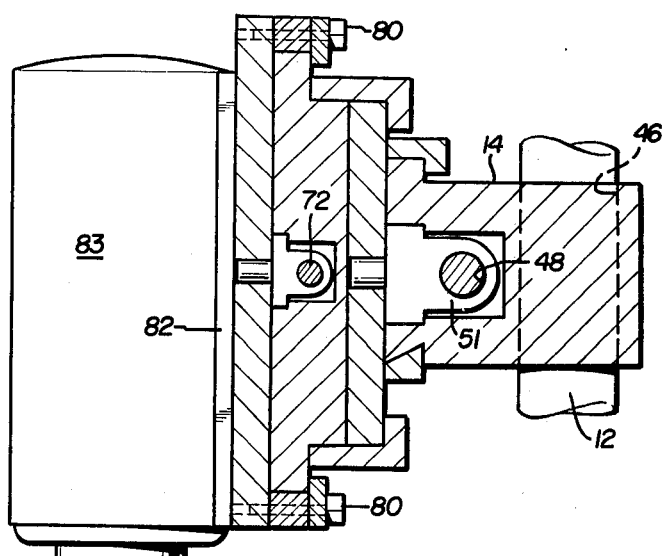
FIG. 6
FIG. 7
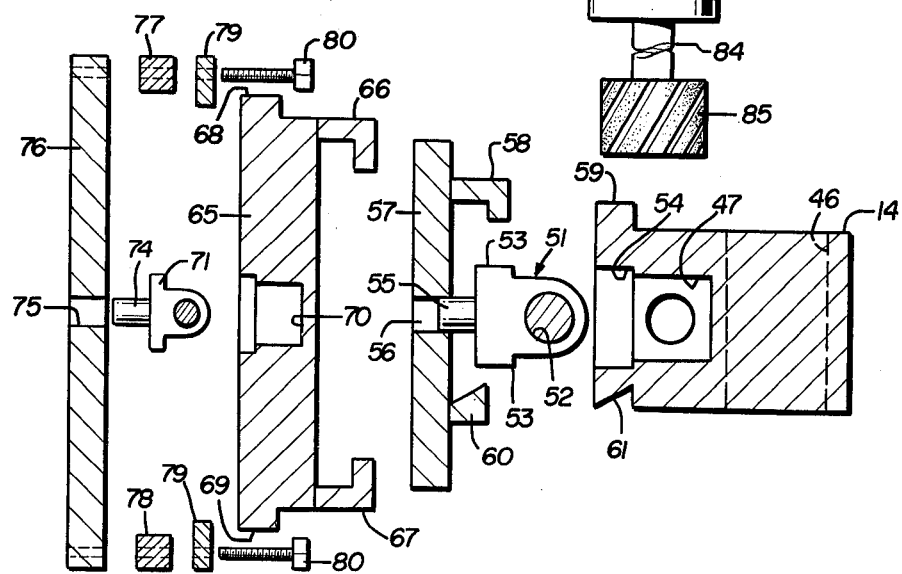
FIG. 8

APPARATUS FOR FORMING LARGE COMPOUND CURVED SURFACES

BACKGROUND OF THE INVENTION

The apparatus herein relates, in general, to the type of apparatus disclosed in my prior U.S. Pat. Nos. 3,464,314 issued Sept. 2, 1969, 3,800,660 issued Apr. 2, 1974 and 3,910,159 issued Oct. 7, 1975. Such apparatus is generally concerned with machining curved surfaces upon large metal plates.

The invention of this present application is more specifically concerned with an apparatus for machining compound curves upon large, plate-like workpieces, i.e., curved surfaces which are both longitudinal and transverse of the workpiece.

By way of example of a workpiece, continuous casting molds used in the process of continuously casting steel into slab form, are generally of a rectangular in cross-section, open upper and lower ended box-like configuration where molten metal is poured into the open upper end, is chilled as it passes through the mold and comes out the bottom at least partially solidified. Such molds are lined with copper-like material plates. In certain types of such molds the plates are curved in transverse cross-section as well as curved from top to bottom. The vertical or longitudinal curvature may be formed to a radius of many feet, e.g., 20 to 40 feet, for example, and the transverse curvature, i.e., looking down, may be formed to a totally different radius of, for example, several feet. In any event the plate which may be perhaps a foot in width, three or four feet in height and two or so inches in thickness, may have a surface which is curved in transverse as well as longitudinal directions, with a considerable degree of accuracy required for such curvatures, such as in the order of two or three thousandths of an inch tolerance, depending upon the particular application.

With the above type of example, it can be seen that machining compound curves on such type plates with the relatively high accuracy required, is difficult to perform in conventional apparatus. Thus, the apparatus of the present invention is directed towards that type of machining operation.

SUMMARY OF INVENTION

The invention herein comprises an apparatus having a plate-like elongated horizontally arranged bed having side edge portions which are curved in the longitudinal direction. A table, mounted upon the bed, has guides engaging the curved edge portions so that the table may be moved longitudinally of he bed, but along an arcuate path defined by the curved edge portions.

Mounted above the table is a cross-bar arranged transversely of the bed, which carries a transversely elongated, vertically arranged plate having an upper elongated edge and a lower elongated edge, each curved to predetermined curvatures and a slide member mounted upon the plate for engagement therewith so that the slide member may be moved transversely of the bed along the arcuate path defined by the plate edges. The plate itself is mounted for horizontal movement upon the cross-bar. Mounted upon the slide member is a motor carrying a machining tool, such as for example, a milling cutter of the vertical axis type.

A large plate-like workpiece may be secured upon the table for movement of the workpiece with the table, longitudinally of the bed, along the curved path and beneath the tool member. The tool member is moved transversely of the bed along a curved path and also along a horizontal transverse path defined by the support plate moving horizontally along the cross-bar.

The elements which comprise the apparatus herein may be fastened upon a conventional planing type machine for thereby relatively inexpensively, and temporarily, converting it into a miller-planer machine for producing the desired large radius curved surfaces.

In essence, the apparatus moves the plate-like workpiece in a vertically axised arc within a horizontal plane, with the tool moving transversely of the workpiece along a different, horizontally axised arcuate path as well as in a straight, horizontal non-arcuate path to thereby produce the required compound curves speedily and inexpensively, with the degree of accuracy required.

These and other objects and advantages of this invention will become apparent upon reading the following description of which the attached drawings form a part.

DESCRIPTION OF DRAWINGS

FIG. 1 is a perspective view of the apparatus herein.

FIG. 2 is an end, elevational view, partially in cross-section, taken in the direction of arrows 2—2 of FIG. 1 and to a slightly enlarged scale.

FIG. 3 is a fragmentary, cross-sectional view of the bed and table.

FIG. 4 is a perspective view of the nut-like member.

FIG. 5 is a perspective, disassembled view of the support bed, guide portions, and table.

FIG. 6 is a disassembled view of the bed plate and table guide members.

FIG. 7 is an enlarged cross-sectional view, taken in the direction of arrows 6—6 of FIG. 2, and FIG. 8 is a cross-sectional view, similar to FIG. 7, but showing the parts disassembled.

DETAILED DESCRIPTION

Figure 9:
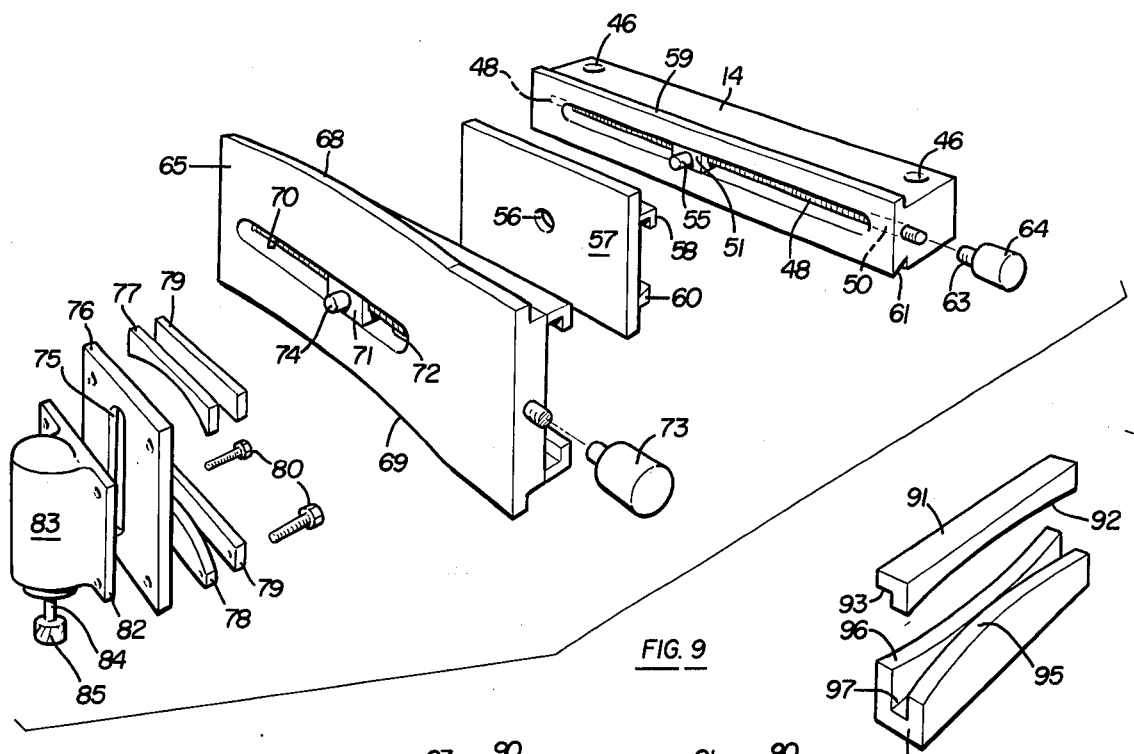
FIG. 9 is a perspective view, with the parts disassembled, of the tool mounting portion of the apparatus.

The apparatus is formed of a base, which is schematically shown as comprising a horizontally arranged bed support plate 10 with legs 11. Vertical columns 12, secured to column supports 13 are arranged at roughly the center of the base for supporting a cross-bar 14 therebetween. A suitable raising and lowering mechanism and locking mechanism may be provided for raising and lowering the cross-bar relative to the base and for locking it into position. This type of structure is conventional and the details of construction are omitted for illustrative purposes.

Secured to the base or bed support plate is a horizontally elongated plate 15 mounted upon legs 16 to form an inverted U-shaped structure upon which a bed plate 18 is secured, as by screws (not shown). The bed plate is provided with a concave curved edge 19 and a convex curved edge 20 which may be formed of strips or rails 19a and 20a welded or removably fastened, as by screws, to the edges of the bed plate itself. The curved edges are formed to a large radius, as for example, twenty or more feet in radius, and are parallel segments of circles. A longitudinally extending slot 21 is formed in the bed plate.

Supported upon the bed plate is a table 23 which is made up of a table plate 24 having side edge channels 25 within which are secured guide strips such as a convex guide strip 26 and a concave guide strip 27. The two guide strips are formed complementary to the curved edges of the bed plate so as to engage, full length of the guide strips, in face to face contact for guiding the table along the arc of curvatuve of the bed plate edges.

A workpiece holding plate 29 connected to support legs 30 is fastened upon the top of the table plate. Workpiece 32 may be fastened by screws or other means, such as clamps or the like, to the workpiece holding plate.

Figures 14, 15:
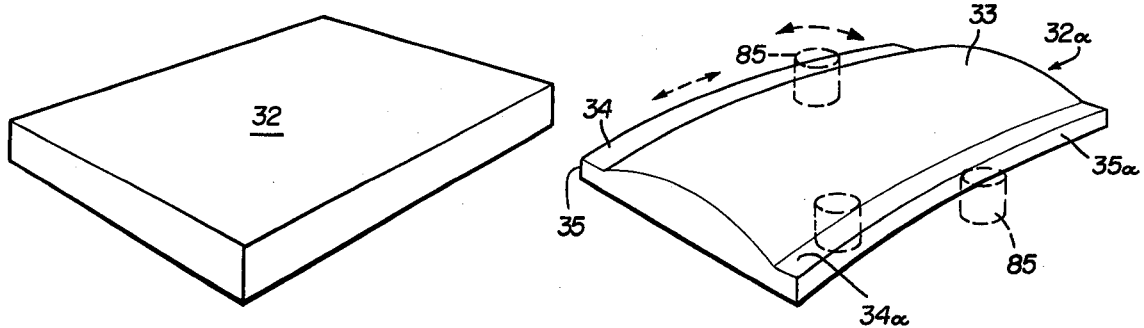
FIG. 14 is a perspective view showing a typical flat metal plate forming the workpiece.
FIG. 15 is a perspective view showing an example of a finished workpiece after machining on the apparatus herein, but with the tool member shown in dotted lines in different machining positions.

As shown in FIG. 14, the workpiece 32 may be in the form of a slab-like or plate-like metal member such as, for example, a copper or copper alloy plate of about two inches in thickness, about six inches to one foot in width and about three to four feet in length. By way of example, the completed workpiece, designated 32a in FIG. 15, may have its upper surface machined into a compound curved upper surface 33 which is bounded by curved border portions 34a and 34 and curved edges 35 and 35a.

In order to move the table 23 upon which the workpiece is mounted, a drive screw 38 is arranged beneath the elongated plate 15 and is connected through a gear box or transmission 40 to an electric motor 40 so that the screw may be rotated in either of two directions. A nut-like member 41 has a threaded opening 42, which is threadedly engaged with the screw, and has an upper channel portion 43 which fits into and is guided in an elongated slot 43a formed in the elongated plate 15. The nut member includes a stud portion 44 extending upwardly through the slot 21 in the plate 18 and into a transverse slot 45 in the table plate 24.

In operation, rotation of the screw 38 in one direction causes the nut-like member 41 to move in one direction longitudinally of the base to thereby move the table plate 24 along the bed plate. Reversal of the direction of rotation causes the plate to move in the opposite direction. Due to the interengagement between the curved guide strips 26–27 and curved bed plate edges 19–20, the table moves along an arcuate path. The stud 44 on the nut-like member moves longitudinally of the plate 15, due to the nut being guided by the longitudinal slot 43a. However, relative to the table plate 24, the stud also moves transversely in the transverse slot 45 in plate 24 to accommodate to the arcuate movement of the plate as it moves longitudinally along the base.

The cross-bar 14 located above the base and supported on the columns, includes vertical openings 46 through which the columns may be passed and secured. In addition, the cross-bar is provided with a slot 47 within which a drive screw 48 extends. One end of the screw is arranged within a socket 49 and the other end extends axially outwardly of the cross-bar through opening 50.

A drive nut 51 (see FIGS. 8 and 10) threadedly receives drive screw 48 within its threaded opening 52. The nut has edge lips 53 for guiding its travel within widened edge portions 54 of slot 47. A stud 55 formed on the nut extends into an opening 56 in support plate 57. Such support plate is slidably interengaged with cross-bar 14 by means of an upper channel 58 receiving an upper edge rail 59 formed on the cross-bar and a lower angled rail 60 on the plate engaging into a lower grove 61 on the cross-bar.

Screw 48 is rotated by means of a reversible motor 63 connected to the end of the screw by a suitable coupling 64. Thus, rotation of the screw causes the nut 51 to appropriately move within the slot 47 to thereby move the support plate 57 in a horizontal direction along the length of the cross-bar.

Mounted upon the support plate 57 is a vertically arranged, flat guide or support plate 65 provided with upper and lower channels 66 and 67 to receive the upper and lower ends respectfully of the plate 57. Thus the guide plate can be arranged to move horizontally relatively to the plate 57 and then fixed in a position thereon by either clamping the channels 66–67 or by suitable screws (not shown).

The upper and lower edges of the plate 65 are curved to form an upper curved guide rail or edge 68 and a lower curved edge or rail 69. These curved edges are formed to a large radius arc, such as a number of feet, and are parallel segments of circles.

A groove or slot 70 formed in the plate 65 receives a nut 71 similar to nut 51. Extending through the nut 71 is a drive screw 72 arranged within the groove 70 for rotation therein, and with an end extending through the plate for coupling to a motor 73 or alternatively, to a suitable manual crank (not shown). Thus, operation of the motor 73 or the corresponding crank, rotates the screw 72 to thereby move the nut 71 so that its outwardly extending stud 74, which fits into a vertically elongated slot 75 in a motor support plate 76, causes the plate to move relative to the guide plate 65. The motor support plate is provided with upper and lower guide strips 77 and 78 having curved surfaces engaging the curved rail portions 68 and 69 of plate 65 and held thereon by means of outer locking strips 79 and suitable screws 80. Thus, movement of the motor support plate 76 upon guide plate 65, results in the motor plate traveling along an arc of a horizontally axised circle.

Connected to the motor support plate 76 by means of a suitable mechanically formed bracket 82 and appropriate screws or bolts (not shown) is a motor 83 for driving a vertically axised shaft 44 upon which a tool 85 is secured. The tool can be a typical milling cutter, i.e., formed with teeth along its end for end milling or along its periphery for side milling, or both, as illustrated schematically in FIG. 15.

In operation, rotation of the screw 47 by the motor 63 causes the support plate 57 to move in a horizontal direction along the length of the cross-bar. Rotation of the motor 73 causes the nut 71 to move and thereby move the motor support plate 76 along an arc. Preferably the guide plate 65 is fixed so as not to move relative to plate 57, so that it moves horizontally therewith. Thus, the tool can be moved along an arc of a circle, as well as horizontally, i.e., longitudinally of the cross-bar. Meanwhile, the workpiece also moves in an arc (see arrows in FIG. 15).

Figures 10, 11, 12:
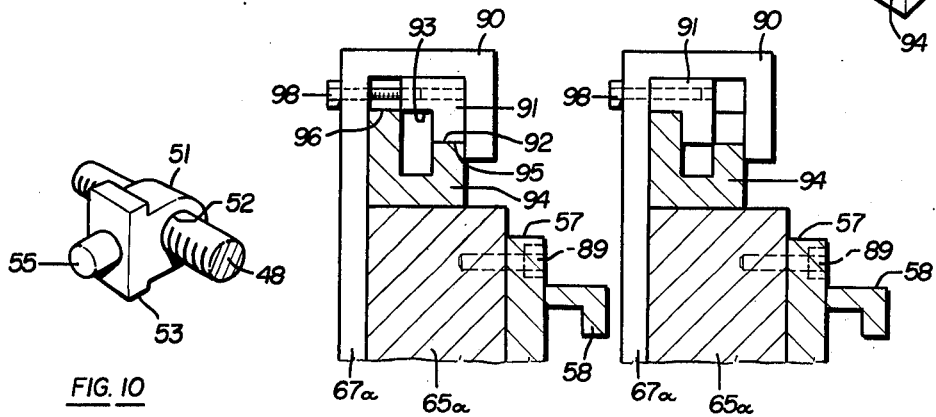
FIG. 10 is an enlarged, fragmentary view of the drive screw and nut for moving the tool support plate.
FIG. 11 is an enlarged, fragmentary cross-sectional view of a modified support plate-slider guide arrangement.
FIG. 12 is a view similar to FIG. 11, but with the guide arrangement in a second position.
Figure 13:
FIG. 13 is a perspective view of modified guide parts of the modification of FIGS. 11–12.

FIGS. 11-13 show a modified form of connection between the motor support plate and the guide plate. Here, the support plate 57 is connected to the guide plate 65a by means of screws 89. The motor support plate 67a is provided with upper and lower channels 90 (only one shown for illustration purposes), within which a movable shifter bar 91 is located.

The shifter bar is formed with a concave surface portion 92 and a convex surface portion 93. Secured to the upper and lower edges of the guide plate 65a are guide rails 94 each having a concave edge portion 95, a convex edge portion 96 and a space 97 between them. A screw 98 causes the shifter bar 91 to move within the channel 90 so that either its concave portion 92 engages the convex portion 95 of the rail 94 or alternatively, its convex portion 93 engages the concave portion 96 of the rail 94. Thus, the movement of the motor support plate 76 can either be along a downwardly concave arc relative to the bed or alternatively a convex arc relative to the machine bed. Otherwise the operation is the same as described above.

By appropriately controlling the motors 63 and 73 by conventional controls (not shown) as well as the main drive motor 41 for moving the table, the workpiece plate is caused to move in a horizontal plane but along an arc, while the machining tool is caused to move transversely of the workpiece and in an arcuate path or a straight path or probably, both, to thereby produce a compound curve and curve portions as shown for example in FIG. 15.

Having fully described an operative embodiment of this invention, I now claim:

1. Apparatus for forming a large radius, compound curve surface upon a large plate-like workpiece comprising:
   an elongated bed having longitudinal opposite side edges, and said edges each being curved along a large radius, vertically axised arc, with the curved edges being parallel along their lengths;
   a table supported upon the bed and spanning said curved side edges, and a guide strip mounted upon each side edge of the table and being curved complementary to its respective bed edge for engagement therewith;
   said table being movable in a horizontal arcuate path longitudinally of the bed due to the engagement of the guide strips with the side edges;
   power means mounted upon the bed and connected with the table for reciprocating the table along the bed, wherein a flat, large plate-like workpiece may be secured to the upper surface of the table for movement therewith;
   tool means mounted above the bed and located for engagement with a workpiece secured upon said table for machining the upper surface of the workpiece as it reciprocates beneath the tool means.

2. Apparatus as defined in claim 1 above, including an elongated cross-bar arranged transversely above the bed and table;
   a horizontally elongated support plate reciprocally mounted upon said cross-bar for reciprocation transversely of the bed, i.e., along the length of the cross-bar;
   said support plate having upper and lower edge portions which are curved along a large radius curve, with said edge portions being parallel along their lengths;
   a slider member mounted upon said support plate and having a pair of spaced apart curved guide strip portions, each complementary to and engaging an adjacent plate curved edge portion, and means for moving the slider member along the arcuate path defined by the interengaged edge portions and guide strip portions, transversely of the bed and along a straight uncurved path of movement of the support plate along the cross-bar;
   and said tool means being mounted upon the slider member and depending downwardly therefrom.

3. Apparatus as defined in claim 2 and said tool means including a motor mounted upon the slider member and a rotary cutter tool rotated by said motor.

4. Apparatus as defined in claim 1, and said bed comprising an elongated, flat, horizontally arranged plate having curved side edge portions curved along the longitudinal direction thereof, and the table guide strips being arranged in edge to edge contact, i.e., forming elongated curved edge to curved edge contact therewith for guiding the table along an arcuate path defined by the curvature of the bed edges and strips as the table moves longitudinally of the plates.

5. Apparatus as defined in claim 4, and said means for reciprocating said table comprising an elongated power driven screw arranged longitudinally of the bed and beneath said bed and a nut-like member threadedly engaging said screw and having an extension portion extending through a longitudinal slot formed in said plate forming said bed and engaged with the table for thereby reciprocating the table due to movement of said nut-like member along the threaded screw as the screw is rotated first in one direction and then in the opposite direction.

6. Apparatus for forming a large radius, compound curve surface upon a large plate-like workpiece comprising:
   an elongated bed having longitudinal, spaced apart opposite side guides, with each guide being curved along a large radius, vertically axised arc, and with the curved guides being parallel along their lengths;
   a table supported upon the bed and spanning said curved side guides, and a guide strip mounted upon each side edge of the table and being curved complementary to its respective bed guide for engagement therewith, said table being movable in a horizontal arcuate path longitudinally of the bed due to the engagement of the guide strips with the side edges;
   power means mounted upon the bed and connected with the table for reciprocating the table along the bed, wherein a flat, large plate-like workpiece may be secured to the upper surface of the table for movement therewith;
   an elongated cross-bar arranged transversely above the bed and table and a horizontally elongated support plate reciprocally mounted upon said cross-bar for reciprocation transversely of the bed, i.e., along the length of the cross-bar;
   said support plate having upper and lower edge portions which are curved along a large radius curve, with said edge portions being parallel along their lengths;
   a slider member mounted upon said support plate and having a pair of spaced apart curved guide strip portions, each complementary to and engaging an adjacent plate curved edge portion, and means for moving the slider member along the arcuate path defined by the interengaged edge portions and guide strip portions, transversely of the bed and along a straight uncurved path of movement of the support plate along the cross-bar;

and powered tool means mounted upon the slider member and depending downwardly therefrom and located for engagement with a workpiece secured upon said table for machining the workpiece as it reciprocates beneath the tool means.

7. Apparatus as defined in claim 6, and said bed comprising an elongated, flat, horizontally arranged plate having side edge portions which are curved along the longitudinal direction thereof, and the table guide strips being arranged in edge to edge contact, i.e., forming elongated curved edge to curved edge contact therewith for guiding the table along an arcuate path defined by the curvature of the bed edges and strips as the table moves longitudinally of the plates.

8. Apparatus as defined in claim 6, and said means for reciprocating said table comprising an elongated power driven screw arranged longitudinally of the bed and beneath said bed and a nut-like member threadedly engaging said screw and having an extension portion extending through a longitudinal slot formed in said plate forming said bed and engaged with the table for thereby reciprocating the table due to movement of said nut-like member along the threaded screw as the screw is rotated first in one direction and then in the opposite direction.

9. Apparatus as defined in claim 8, and said means for moving the slider member comprising an elongated power driven screw mounted upon and arranged longitudinally of the support plate and a nut-like member threadedly engaging said screw having an extension portion engaged with the slider member for thereby reciprocating the slider member due to movement of said nut-like member along the threaded screw as the screw is rotated first in one direction and then in the opposite direction.

10. Apparatus as defined in claim 9, including an elongated power driven screw mounted upon and arranged longitudinally of the cross-bar and a nut-like member threadedly engaging said screw and having an extension portion connected with the support plate for thereby reciprocating the support plate along the length of the cross-bar upon rotation of the threaded screw.

* * * * *